(No Model.)

D. L. REANEY.
BRAKE FOR BICYCLES.

No. 483,621. Patented Oct. 4, 1892.

Witnesses:
H. B. Kingsbery
O. E. Northup

Inventor:
David L. Reaney,
by his attorney,
Wm E. Coulter

UNITED STATES PATENT OFFICE.

DAVID LEWIS REANEY, OF BRADFORD, ENGLAND.

BRAKE FOR BICYCLES.

SPECIFICATION forming part of Letters Patent No. 483,621, dated October 4, 1892.

Application filed March 5, 1892. Serial No. 423,958. (No model.)

*To all whom it may concern:*

Be it known that I, DAVID LEWIS REANEY, a subject of the Queen of England, residing at Bradford, England, have invented certain Improvements in Hub-Brakes for Bicycles, Tricycles, and other Velocipedes, of which the following is a specification.

The object of this invention is to provide a simple and efficient hub-brake for bicycles, tricycles, and other velocipedes, particularly applicable to velocipedes having pneumatic tires or when it is otherwise inconvenient or undesirable to apply the brake directly to the tire or tires. For this purpose I form a stout screw-thread on the spindle or axle of the velocipede and I mount a screw-collar thereon having an operating arm or lever. A male or female cone is mounted on said collar in such a manner that the collar is free to turn within the boss of the cone, but is prevented from longitudinal motion in relation thereto, and said cone is kept from rotation in any convenient manner. A cone-face fitting the above-mentioned cone is formed on the hub of the vehicle-wheel, and any suitable means are provided for more or less rotating said screwed collar to bring the two conical faces in close contact, and thus apply the brake.

Figure 1:
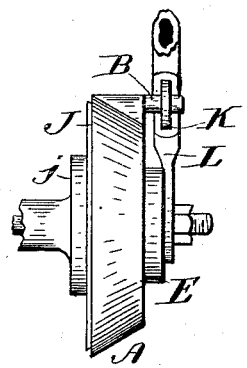
Figure 2:
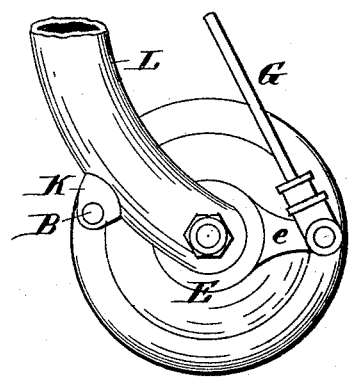
Figures 3, 4:
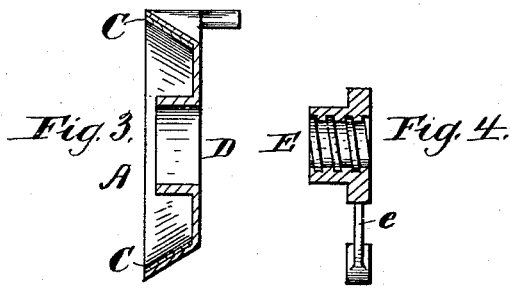
Figure 5:

In the accompanying drawings, Figure 1 is a back view of one of the front forks and a portion of the hub of a Safety bicycle with my improvements applied thereto. Fig. 2 is a side view of the same. Figs. 3 and 4 are diametrical sections of the brake-cone and the screw-collar, and Fig. 5 is a separate view of the screwed spindle.

The spindle H has a screw-thread $a$ formed at one end, and the screwed collar E is mounted thereon. The female cone A is mounted upon the collar E by the central hole D through its boss and is riveted in that position, so that the collar is perfectly free to turn within it, but is prevented from end motion in regard to it. An arm $e$, rigidly secured to the collar, is connected to the brake-rod G, which is arranged to be operated in any ordinary manner, so as to partly turn the collar through the medium of arm $e$ in the proper direction to move it upon the screw toward the wheel. At the same time the cone A is kept from rotation by means of the pin B, firmly fixed to the periphery, loosely fitting the eye K, secured to the fork L. The male cone J, Fig. 1, is rigidly secured to or forms part of the hub $j$, and its periphery fits the interior of cone A, which latter is preferably provided with a leather liner C. It will be readily understood that the two conical faces of A and J may be brought together with sufficient pressure by the above-described mechanism, so as to apply the brake to any required extent, and the parts are restored to their normal position by the usual spring fitted, in connection with the rod G in the ordinary type of brake, to hold the brake off.

It is obvious that the position of the two cones may be reversed—that is to say, the female cone may be secured to the hub and the male cone mounted upon the screw-collar.

Instead of turning the screw-collar E to apply the brake, such collar may be fixed and the cone A rotated; but when such cone is rotated in the same direction to that in which the wheel is revolving its action is too severe, and when in the reverse direction the whole strain is thrown upon the brake-rod.

I claim—

1. In a hub-brake, the combination, with the wheel-spindle and the hub, said spindle having a threaded portion, as described, of a cone secured to said hub, an internally-threaded collar revolubly mounted on the threaded portion of the spindle, a second cone mounted upon said collar and adapted to be moved laterally thereby to cause it to engage the first cone, and an operating-lever connected at one end with the said collar and adapted to turn the same, as described.

2. The combination, with the cone A, of the pin B, fixed thereto and arranged to engage a stationary portion of the velocipede so as to keep cone A from rotation without materially interfering with the side motion of said cone A, substantially as herein shown and described, and for the purpose specified.

In testimony whereof I have hereunto set my hand in the presence of the two subscribing witnesses.

DAVID LEWIS REANEY.

Witnesses:
DAVID NOWELL,
SAMUEL A. DRACAP.